(12) United States Patent
Wang (10) Patent No.: US 8,989,316 B1
(45) Date of Patent: Mar. 24, 2015

(54) METHOD FOR ESTIMATING AND CORRECTING A CARRIER FREQUENCY OFFSET OVER DISPERSIVE BUT SPECTRALLY FLAT CHANNELS

(71) Applicant: PMC-Sierra US, Inc., Sunnyvale, CA (US)

(72) Inventor: Xiaofeng Wang, Beaconsfield (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 131 days.

(21) Appl. No.: 13/746,219

(22) Filed: Jan. 21, 2013

(51) Int. Cl.
  *H04L 27/00* (2006.01)
  *H04L 7/04* (2006.01)
(52) U.S. Cl.
  CPC ..................... *H04L 7/042* (2013.01)
  USPC .......................................................... 375/326
(58) Field of Classification Search
  USPC .......................................................... 375/326
  See application file for complete search history.

(56) References Cited

U.S. PATENT DOCUMENTS

| 7,130,332 B1* | 10/2006 | Shenoi ........................ 375/150 |
| 2010/0035568 A1* | 2/2010 | Ghosh ........................ 455/192.1 |
| 2011/0085797 A1 | 4/2011 | Xu et al. | |

OTHER PUBLICATIONS

Feigin, "Practical Costas loop design", RF Design, Jan. 2002, pp. 20-36.
Viterbi, et al., "Nonlinear estimation of PSK-modulated carrier phase with application to burst digital transmission", IEEE Transactions on Information Theory, Jul. 1983, vol. IT-29, No. 4, pp. 543-551.

\* cited by examiner

*Primary Examiner* — Tanmay Shah
(74) *Attorney, Agent, or Firm* — Dennis R. Haszko (57) ABSTRACT

A method for estimating a carrier frequency offset over a dispersive but spectrally flat channel comprises determining an autocorrelation of a received oversampled complex baseband digital signal, and estimating the carrier frequency offset based on an angle of the determined autocorrelation.

27 Claims, 5 Drawing Sheets

METHOD FOR ESTIMATING AND CORRECTING A CARRIER FREQUENCY OFFSET OVER DISPERSIVE BUT SPECTRALLY FLAT CHANNELS

FIELD

The present disclosure relates to a method for estimating and correcting a carrier frequency offset over dispersive but spectrally flat channels, such as optical communication channels.

BACKGROUND

For coherent demodulation of modulated signals, a transmitted carrier frequency and phase must be recovered at the receiver in order to demodulate a modulated signal. If a dominant carrier spectral line exists in the modulated signal, a simple bandpass filter followed by a phase-locked loop (PLL) may be used to recover the transmitted carrier frequency and phase from the modulated signal. In modern communication systems, a carrier signal is often suppressed to save power. When the carrier signal is suppressed, more advanced methods must be utilized to recover the transmitted carrier frequency and phase of a modulated signal.

For communication systems with suppressed carriers, blind carrier recovery methods, such as Costas loop, Viterbi and Viterbi, and decision directed methods, use signal constellation properties at baseband to estimate and correct frequency offset between the transmit carrier and the carrier generated locally at the receiver, such as by the use of an oscillator. The use of signal constellation properties at baseband, as in the above mentioned known blind carrier recovery methods, leads to lower jitter and requires lower implementation cost in comparison to carrier recovery methods that work with the carrier signal directly. Due to inherent phase ambiguity of the signal constellation, the known blind carrier recovery methods often have a limited capture range smaller than $$\frac{2\pi}{M},$$

where M is the signal constellation size. This precludes the use of known blind carrier recovery methods when the frequency offset between transmit carrier and receive carrier is larger than $$\frac{2\pi}{M}.$$

In communication systems, such as optical and wireless communication systems, the locally generated carrier frequency at the receiver may differ from the carrier frequency at the transmitter. The offset of the carrier frequency (hereinafter referred to as the carrier frequency offset) may be as large as the signal bandwidth of the modulated signal. For example, commercial tunable laser oscillators have an accuracy of ±2.5 GHz which leads to a carrier frequency offset as large as 5 GHz.

There often exists a tradeoff between capture range and accuracy for constellation-based blind carrier recovery schemes: the larger the desired captured range, the coarser the frequency estimation accuracy. Even when the frequency offset is less than $$\frac{2\pi}{M},$$

it is beneficial to have a simple coarse carrier recovery scheme to first correct some carrier frequency offset before a signal constellation-based carrier recovery scheme is applied.

For spectrally flat channels, such as fiber channels or certain wireless channels, a carrier frequency offset may be estimated by finding the center of the spectrum of the oversampled baseband signal. The spectrum of the oversampled baseband signal may be implemented by fast Fourier transform (FFT). The accuracy of this method is determined by the FFT size and the number of FFT blocks. Drawbacks of this method of estimating the carrier frequency offset include its relatively high complexity and coarse accuracy.

A method for blindly estimating and correcting a carrier frequency offset at a receiver is described in U.S. Patent Application Publication No. 2011/0085797. The method described in this patent publication exploits the relationship between a frequency offset and a maximal phase error measured with the known Gardner algorithm for timing offsets within one symbol duration. This requires the evaluation of Gardner phase errors at a number of timing offsets, typically in the order of a dozen to a few tens of timing offset values. To do so, the received digital signal also needs to be digitally up-sampled to a higher rate. The accuracy of this coarse frequency offset estimation is in the range of ±1 GHz, which is still large for the fine signal-based carrier recovery methods and limits its application to small signal constellations. A drawback of the method disclosed in this patent is that it utilizes a complicated digital up-sampler to oversample the received signal that is originally sampled at no more than two samples per symbol.

Improvements in methods for estimating and correcting carrier frequency offsets are therefore desirable.

BRIEF DESCRIPTION OF THE DRAWINGS

Embodiments of the present disclosure will be described, by way of example, with reference to the drawings and to the following description, in which.

DETAILED DESCRIPTION

The present disclosure relates to a method that estimates and corrects a carrier frequency offset, in which the carrier frequency offset has a magnitude that is proportional to the signal bandwidth. The method according to an embodiment of the present disclosure is applicable to channels with flat magnitude response and arbitrary phase response, such as many fiber optical channels, without knowledge of pilot or training signals.

According to a first aspect, the present disclosure provides method for estimating a carrier frequency offset over a dispersive but spectrally flat channel that includes: determining an autocorrelation of a received oversampled complex baseband digital signal, and estimating the carrier frequency offset based on an angle of the determined autocorrelation.

The carrier frequency offset may be estimated based on the autocorrelation of the received oversampled complex baseband digital signal, the time lag up on which the autocorrelation is evaluated, with a first constant determined based on a cutoff frequency of transmit and receive filters, and a second constant associated with a capture range. The autocorrelation may be determined in accordance with $R_y(k)=\Sigma_n y(n)y^*(n-k)$, wherein y(n) is an nth sample of the received complex oversampled baseband signal sampled at frequency greater than $f_b$, and k is an integer less than fs/fb, wherein $f_s$ is a sampling frequency and $f_b$ is the baud rate of the received oversampled complex baseband digital signal.

According to another aspect, a corrected carrier frequency offset may be generated based on the estimated carrier frequency offset. The corrected carrier frequency offset may be generated by adjusting a local oscillator to compensate for the estimated carrier frequency offset or by applying a direct digital frequency correction to the received oversampled complex baseband digital signal based on the estimated carrier frequency offset. The frequency offset may be estimated in accordance with $$\Delta f = \frac{f_s}{2\pi k \alpha} \text{angle}[R_y(k)],$$

wherein $f_s$ is a sampling frequency and $f_b$ is the baud rate of the received oversampled complex baseband digital signal, α is a constant, and k is an integer that is less than or equal to $f_s/(2f_b)$. α may be a constant having a value between about 0.5 and about 0.8. α may be a constant having a value about one. k may be determined in accordance with $k=\lfloor f_s/(2f_{cap})\rfloor$, wherein $f_s$ is a sampling frequency and $f_{cap}$ is a capture range. The corrected carrier frequency offset may be generated based on the estimated carrier frequency offset when the carrier frequency offset is determined to be greater than a predetermined accuracy threshold. The steps of determining and estimating may be repeated until the determined carrier frequency offset is less than the predetermined accuracy threshold. The corrected carrier frequency offset may be generated by adjusting a local oscillator to compensate for the estimated carrier frequency offset or by applying a direct digital frequency correction to the received oversampled complex baseband digital signal based on the estimated carrier frequency offset.

According to still another aspect, the present disclosure provides a non-transitory computer-readable medium having computer-readable instruction executable by at least one processor of a receiver for determining an autocorrelation of a received oversampled complex baseband digital signal; and estimating a carrier frequency offset over a dispersive but spectrally flat channel based on an angle of the determined autocorrelation.

According to still another aspect, the present disclosure provides a receiver comprising: operational components including a demodulator and analog-to-digital converters for converting a modulated passband signal received over a dispersive but spectrally flat channel to an oversampled complex baseband digital signal; and a processor operably coupled to the operational components and configured to: determine an autocorrelation of the oversampled complex baseband digital signal; and estimate a carrier frequency offset over the dispersive but spectrally flat channel based on an angle of the determined autocorrelation.

An embodiment of the present disclosure makes use of the second-order statistics of the received oversampled complex baseband signal. The method of the present disclosure is simpler than the known methods and only requires that the channel is spectrally flat. The accuracy of the carrier frequency offset estimation determined utilizing an embodiment of the method of the present disclosure is not affected by the amount of channel phase distortion.

Figure 1:
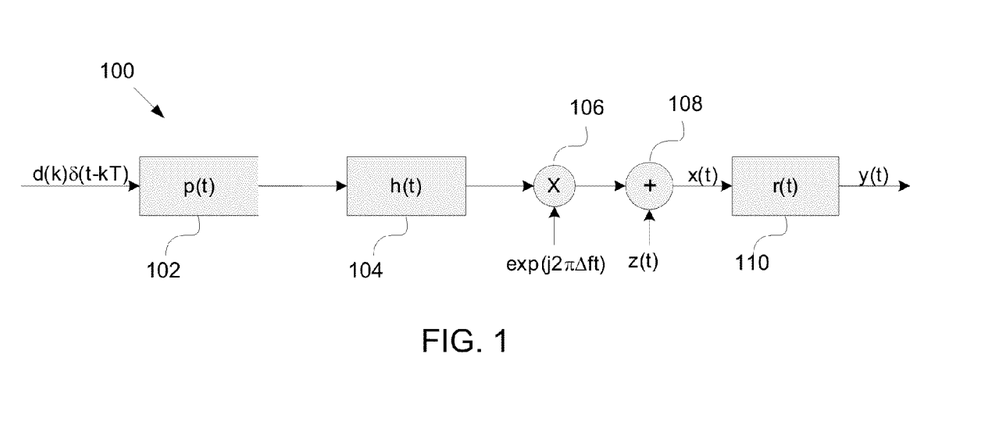
FIG. 1 is a block diagram of a complex baseband model of a communication system in accordance with an embodiment of the present disclosure.

A block diagram of an example embodiment of a complex baseband representation of a communication system 100 is shown in FIG. 1. The system 100 includes a lowpass pulse shaping transmit filter 102, a baseband equivalent channel 104, a multiplier 106, an adder 108, and a lowpass receive filter 110. In operation, a complex baseband digital data stream with baud interval $T=1/f_b$ (where $f_b$ is the baud rate) passes through the transmit filter 102 that converts it into a complex baseband signal. The complex baseband signal is transmitted through the baseband equivalent channel 104, where the signal is convolved with the impulse response of the baseband equivalent channel 104. At the end of the channel, a frequency offset of Δf is added to the complex baseband signal by multiplying it with a complex exponential $e^{j2\pi\Delta f}$. Gaussian noise z(t) is also added to the complex baseband signal. The complex digital baseband signal x(t) then passes through the receive filter 110, and the output is the received complex baseband signal y(t). For digital signal processing, y(t) may be converted to an oversampled complex baseband digital signal y(n) by an analog-to-digital converter, which is not shown in FIG. 1. In the embodiment shown in FIG. 1, the baseband equivalent channel 104 is dispersive with a flat magnitude response (i.e. the baseband equivalent channel, |H(f)|, is a constant when frequency f is within signal bandwidth).

The autocorrelation of the complex baseband signal at the output of the receive filter 110 is:

$$R_y(\tau)=E[y(t)y^*(t-\tau)]=F^{-1}[|P(f-\Delta f)|^2|R(f)|^2]+R_r(0)\sigma^2\delta(\tau) \quad \text{Equation 1}$$

where y* is the complex conjugate of y(t), P(f) is the frequency response of transmit filter 102, R(f) is the frequency response of receive filter 104, $R_r(0)$ is the zero-lag autocorrelation of r(t), $\sigma^2$ is the variance of z(t), and $F^{-1}$ is the inverse Fourier transform.

In communication systems with a flat channel magnitude response, lowpass transmit and receive filters limit the bandwidth of the received complex baseband signal. The autocorrelation of the received complex baseband signal may be approximated, for example, utilizing the following equation:

$$R_y(\tau)=k\exp(j2\pi\alpha\Delta f\tau), \tau<1/f_b \quad \text{Equation 2}$$

In Equation 2, k is a constant and α is a real number that depends on the cutoff frequencies of the transmit filter 102 and receive filter 110. For ideal lowpass transmit and receive filters with cutoff frequency $f_c=f_b/2$, α=0.5. α is independent of Δf when the received signal spectrum is symmetric about its center $f_c+\Delta f$ and when signal spectrum has finite rolloff. In the system 100, the lowpass transmit filter 102 and receive filter 110 have finite rolloff and passband ripples, and therefore the spectrum of the received complex baseband signal is approximately symmetric and α is almost invariant with Δf.

Figure 2:
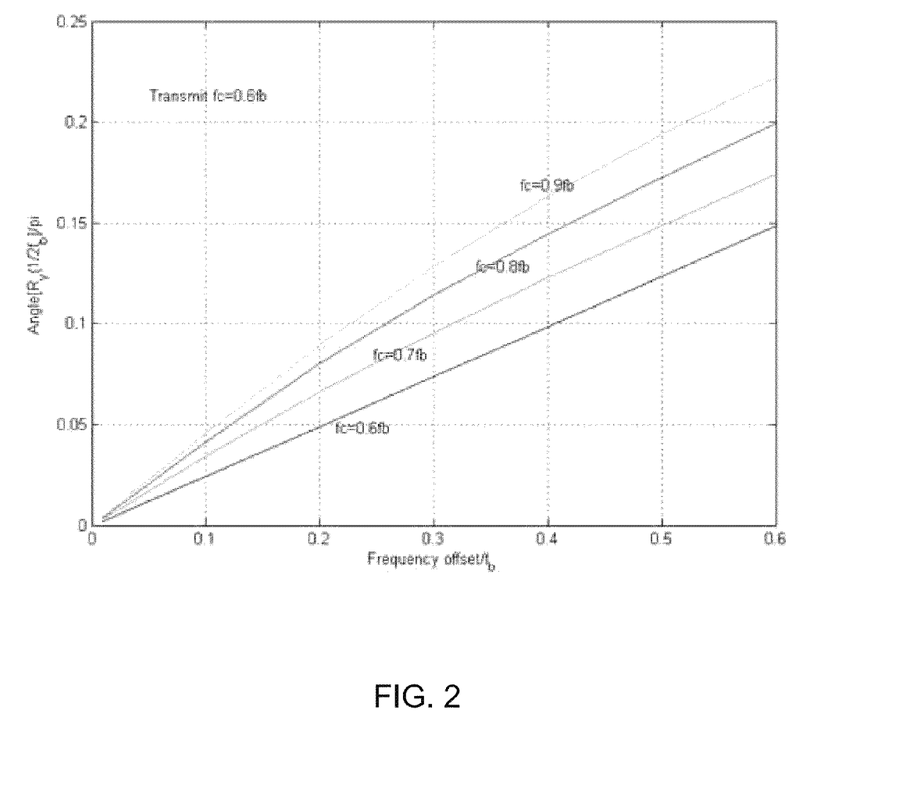
FIG. 2 is a graph of angles of the autocorrelation of a complex digital baseband signal as a function of carrier frequency offset in accordance with an embodiment of the present disclosure.

Referring to FIG. 2, a graph of the angles of the autocorrelation of a complex digital baseband signal, $R_y(\tau)$, as a function of carrier frequency offset are shown for a $4^{th}$-order Butterworth transmit and receive filters with different 3-db bandwidth. In FIG. 2, the curves are all approximately straight lines, indicating that α is invariant with the carrier frequency offset for a given signal bandwidth. On the other hand, α depends on the bandwidths of transmit and receive filters. As the cutoff frequency $f_c$ of a 4th-order Butterworth filter increases from 0.55 $f_b$ to 0.85 $f_b$, α increases from about 0.5 to about 0.75.

Any small magnitude distortion of a channel may be combined with the transmit filter 102. It is noted that the approximation in Equation 2 applies to channels with small magnitude distortion.

Figure 3:
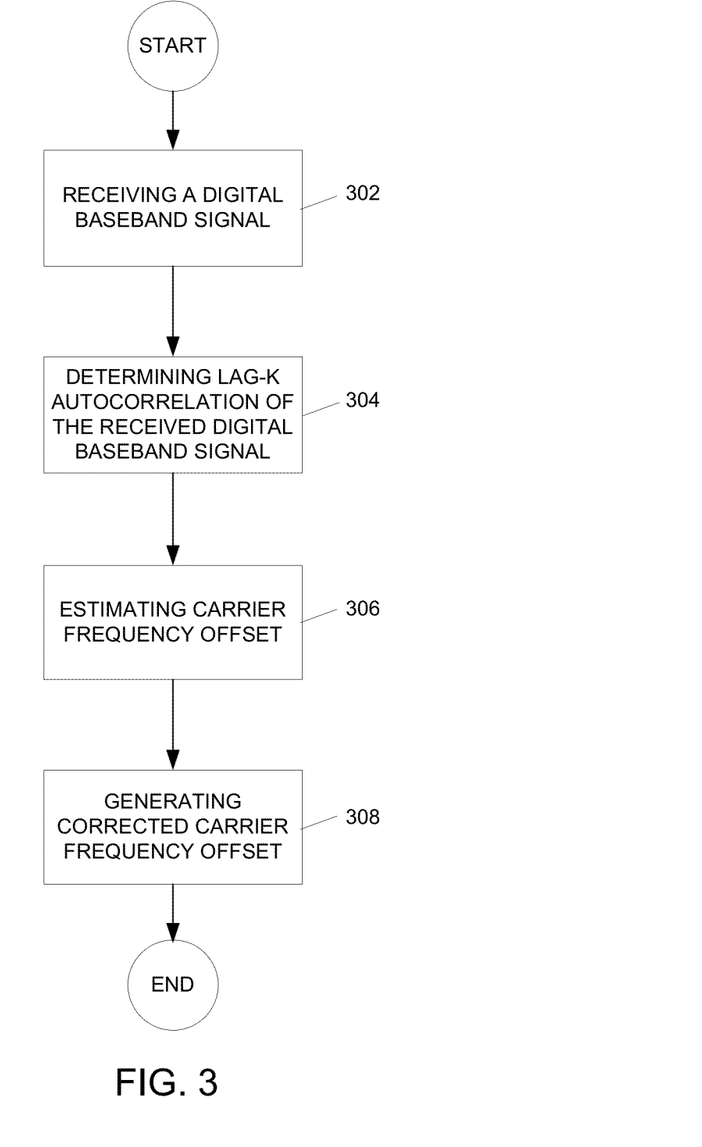
FIG. 3 is flowchart illustrating a method for estimating and correcting a carrier frequency offset over a dispersive but spectrally flat channel in accordance with an embodiment of the present disclosure.

A flowchart illustrating a method for estimating and correcting a carrier frequency offset (Δf) over a dispersive but spectrally flat channel in accordance with an embodiment of the present disclosure is shown in FIG. 3. The method may be carried out by software executed, for example by, at least one processor of a receiver, or firmware stored in a computer-readable storage device that is executed by a processor of a receiver. Coding of software for carrying out such a method is within the scope of a person of ordinary skill in the art given the present description. The method may contain additional or fewer processes than shown and/or described. Computer-readable code executable by at least one processor of a receiver to perform the method may be stored in a computer-readable medium. Alternatively, the method may be implemented in hardware, such as digital logic blocks in an application specific integrated circuit (AISC), or a combination of firmware and hardware. Implementation of the method in an ASIC of the present method is within the scope of a person of ordinary skill in the art given the present description.

An oversampled complex digital baseband signal is received at 302 by sampling y(t) in FIG. 1 using an analog-to-digital converter (ADC) and the method proceeds to 304. At 304, a real part and an imaginary part of the lag-k autocorrelation of the received oversampled complex digital baseband signal is determined, utilizing, for example, the following equation:

$$R_y(k) = \sum_n y(n) y^*(n-k) \qquad \text{Equation 3}$$

where y(n) is the nth sample of the received complex baseband signal sampled at frequency $f_s > f_b$, and k<fs/fb is an integer. The number of terms in the summation of Equation 3 has a range of about a few hundreds to about a couple of thousands, depending on the received signal-to-noise ratio and target accuracy. For example, when the received signal-to-noise ratio is 6 dB, 1600 terms in the summation ensures a greater than 99% probability that the frequency estimation error is less than $R_b/16$.

The method then proceeds to 306 where a carrier frequency offset is estimated, for example, utilizing the following equation:

$$\Delta f = \frac{f_s}{2\pi k \alpha} \text{angle}[R_y(k)] \qquad \text{Equation 4}$$

in which the value of α depends on a cutoff frequency of the transmit filter 102, a cutoff frequency of the receive filter 110, and a magnitude response of the channel.

For practical communication systems, α is generally in the range of 0.5 to 0.8. The angle of the complex number $R_y(k)$ is determined as the inverse tangent of the ratio of its real part to its imaginary part. The inverse tangent may be determined from a lookup table or utilizing a Coordinate Rotation Digital Computer (CORDIC) algorithm, as known to a person of ordinary skill in the art.

With a sampling frequency $f_s = 2 f_b$ and k=1, from Equation 4, the capture range of an embodiment of the present disclosure is $\pm f_b$ for α=1 and larger than $\pm f_b$ for α<1. In general, the capture range is $\pm f_s/(2k)$. A tradeoff exists between the capture range, the accuracy of the estimation of the carrier frequency offset, and the number of summation terms in Equation 3. For example, a larger k corresponds to a smaller capture range but higher accuracy with a given number of summation terms in Equation 3. In an embodiment, for a capture range of $\pm f_{cap}$, k is selected utilizing the following equation to maximize the accuracy of the estimation of the carrier frequency offset.

$$k = \lfloor f_s/(2 f_{cap}) \rfloor \qquad \text{Equation 5}$$

When the required capture range is $\pm f_b$, k may be selected to be the integer immediately smaller than or equal to fs/(2$f_b$) to maximize the accuracy of the estimation of the carrier frequency offset.

After the carrier frequency offset is estimated at 306, the method proceeds to 308 where a corrected carrier frequency offset is generated, and the method ends. A corrected carrier frequency offset may be generated by, for example, changing a demodulating local oscillator (LO) frequency, or by direct digital frequency correction. Methods of direct digital frequency correction are known to a person of skill in the art and are therefore not described in further detail.

Uncertainty often exists in transmit and receive filters and the channel may not be perfectly flat. In an alternative embodiment, α in Equation 4 is chosen to be one, or slightly smaller than one, to prevent overestimating the carrier frequency offset. To accurately estimate the carrier frequency offset, several iterations of the method of carrier frequency offset estimation and correction described above with reference to FIG. 3 may be performed until the estimated frequency offset is less than a predefined accuracy threshold, which is defined, for example, as a fraction of the baud rate. For example, two to four iterations are sufficient to achieve an accuracy of $f_b/16$ when α=1.

Figure 4:
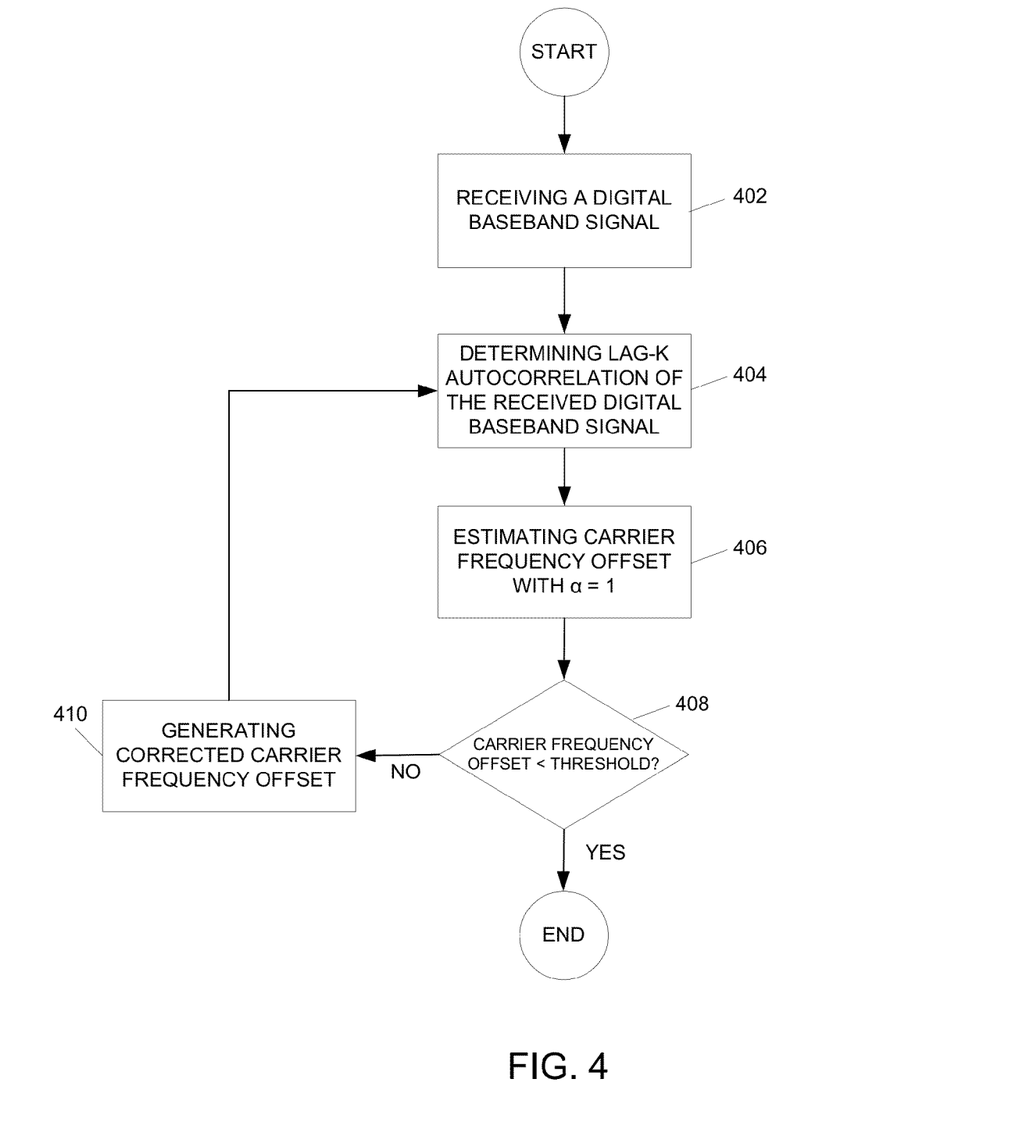
FIG. 4 is flowchart illustrating a method for estimating and correcting a carrier frequency offset over a dispersive but spectrally flat channel in accordance with another embodiment of the present disclosure.

A flowchart illustrating a method for estimating and correcting a carrier frequency offset over a dispersive but spectrally flat channel in accordance with the alternative embodiment of the present disclosure described in the preceding paragraph is shown in FIG. 4. The method may be carried out by software executed, for example by, at least one processor of a receiver, or firmware stored in a computer-readable storage device that is executed by a processor of a receiver. Coding of software for carrying out such a method is within the scope of a person of ordinary skill in the art given the present description. The method may contain additional or fewer processes than shown and/or described. Computer-readable code executable by at least one processor of a receiver to perform the method may be stored in a computer-readable medium. Alternatively, the method may be implemented in hardware, such as digital logic blocks in an application specific integrated circuit (AISC), or a combination of firmware and hardware. Implementation of the method in an ASIC of the present method is within the scope of a person of ordinary skill in the art given the present description.

In the embodiment shown in FIG. 4, steps 402, and 404 are similar to steps 302, 304 of the embodiment shown in FIG. 3 and described above. That is, at 402, an oversampled complex digital baseband signal is received, and the method proceeds to 404. At 404, a real part and an imaginary part of the lag-k autocorrelation of the received oversampled complex digital baseband signal is determined utilizing Equation 3 as described above. After the lag-k autocorrelation of the received oversampled complex digital baseband signal is determined at 404, the carrier frequency offset is estimated at 406 utilizing Equation 4. In the embodiment shown in FIG. 4, the carrier frequency offset is estimated utilizing Equation 4, in which α is chosen to be one, or slightly less than one, to prevent overestimating the carrier frequency offset. After the carrier frequency offset is estimated at 406, the method proceeds to 408.

At 408, a determination is made as to whether the estimated carrier frequency offset is less than a predetermined accuracy threshold. When the estimated carrier frequency offset is less than a predetermined accuracy threshold at 408, the method ends. When the estimated carrier frequency offset at 408 is greater than a predetermined accuracy threshold, the method proceeds to 410. At 410, a corrected carrier frequency offset is generated, and the method returns to 404, where the steps 404, 406, and 408 are repeated until the estimated carrier frequency offset is less than a predetermined accuracy threshold. A corrected carrier frequency offset may be generated, for example, by changing a demodulating local oscillator (LO) frequency, or by direct digital frequency correction. The implementation details for correcting the frequency offset by changing a demodulating local oscillator (LO) frequency, or by direct digital frequency correction are known to a person of ordinary skill in the art and therefore not described in detail.

Figure 5:
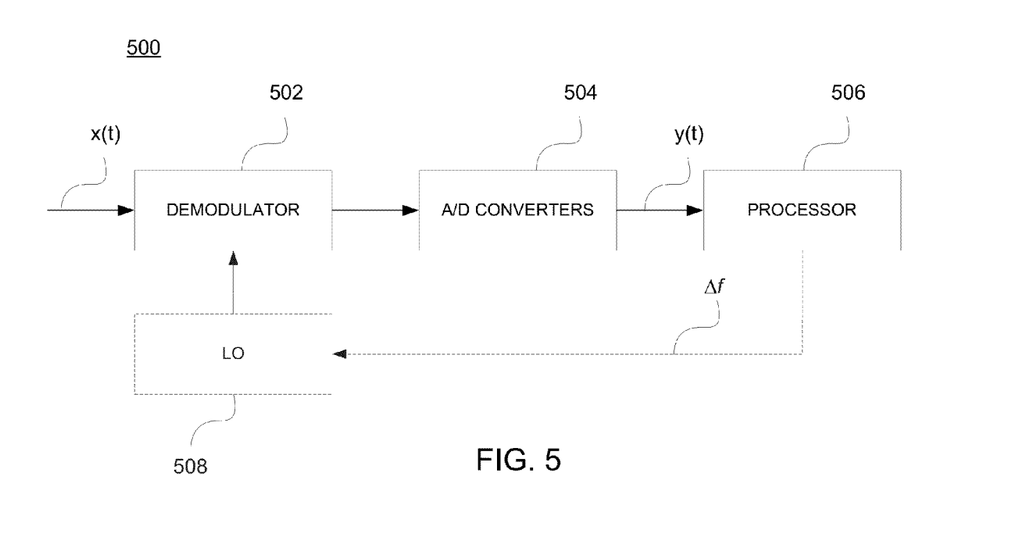
FIG. 5 is a block diagram of a receiver model in accordance with an embodiment of the present disclosure.

Referring to FIG. 5, a block diagram of a receiver 500 in accordance with an embodiment of the present disclosure is shown. The receiver 500 comprises a demodulator 502, analog-to-digital (A/D) converters 504, a processor 506, and an optional local oscillator 508. The receiver 500 receives a modulated high frequency signal x(t) over a dispersive but spectrally flat channel, such as, a fiber optic communications channel or a wireless communication channel, and demodulates the modulated high frequency signal to a baseband signal. The A/D converters 504 convert the demodulated baseband signal to an oversampled complex baseband digital signal, which is received by the processor 506. The processor 506 receives the complex oversampled baseband digital signal y(t) and estimates a carrier frequency offset over the dispersive but spectrally flat channel in accordance with the embodiments described above with reference to FIG. 3 and FIG. 4. The processor 506 may also generate a corrected carrier frequency offset by either controlling the LO 508 or by using a digital frequency corrector.

Advantageously, the carrier frequency offset estimation method described herein has a large capture range and works with digital baseband signals. The method described herein only needs to estimate the autocorrelation of a chosen lag of a received signal that is sampled at more than one sample per symbol (i.e. one baud). The accuracy of the method of the present disclosure is unaffected by channel phase distortion and is therefore applicable to long-haul fiber channels. Additionally, because the carrier frequency offset estimation method described herein provides a small frequency offset with a large capture range, the method may be advantageously used in conjunction with known constellation based frequency recovery methods that have small capture range and high accuracy. The combination of these two methods may be used for estimating and correcting a carrier frequency offset for a dispersive but spectrally flat channel so that the corrected carrier frequency offset has a large capture range and high accuracy.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. A method of estimating a carrier frequency offset over a dispersive but spectrally flat channel, the method comprising:
   determining an autocorrelation of a received oversampled complex baseband digital signal; and
   estimating the carrier frequency offset in accordance with $$\Delta f = \frac{f_s}{2\pi k \alpha} \text{angle}[R_y(k)]$$

wherein $f_s$ is a sampling frequency, α is a constant, k is a constant associated with a capture range, and $R_y(k)$ is the determined autocorrelation of the received oversampled complex baseband digital signal.

2. The method of claim 1, wherein α is determined based on a cutoff frequency of transmit and receive filters in a complex baseband representative of a communication system that includes the channel and a magnitude response of the channel.

3. The method of claim 1, wherein the autocorrelation is determined in accordance with $$R_y(k) = \Sigma_n y(n) y^*(n-k)$$

wherein y(n) is an nth sample of the received complex oversampled baseband signal sampled at frequency greater than $f_b$, and k is an integer less than $f_s/f_b$, wherein $f_b$ is the baud rate of the received oversampled complex baseband digital signal.

4. The method of claim 1, comprising generating a corrected carrier frequency offset based on the estimated carrier frequency offset.

5. The method of claim 4, wherein generating a corrected carrier frequency offset comprises adjusting a local oscillator to compensate for the estimated carrier frequency offset.

6. The method of claim 4, wherein generating a corrected carrier frequency offset comprises applying a direct digital frequency correction to the received oversampled complex baseband digital signal based on the estimated carrier frequency offset.

7. The method of claim 1, wherein α is a constant having a value between 0.5 and 0.8.

8. The method of claim 1, wherein α is a constant having a value of one.

9. The method of claim 1, wherein k is determined in accordance with $$k=\lfloor f_s/(2f_{cap})\rfloor$$

wherein $f_{cap}$ is a capture range.

10. The method of claim 8, further comprising in response to a determination that the carrier frequency offset is greater than a predetermined accuracy threshold, generating a corrected carrier frequency offset based on the estimated carrier frequency offset.

11. The method of claim 10, further comprising repeating the determining and estimating until the determined carrier frequency offset is less than the predetermined accuracy threshold.

12. The method of claim 11, wherein generating a corrected carrier frequency offset comprises adjusting a local oscillator to compensate for the estimated carrier frequency offset.

13. The method of claim 11, wherein generating a corrected carrier frequency comprises applying a direct digital frequency correction to the received oversampled complex baseband digital signal based on the estimated carrier frequency offset.

14. A non-transitory computer-readable medium having computer-readable instructions executable by at least one processor of a receiver for:
determining an autocorrelation of a received oversampled complex baseband digital signal; and
estimating a carrier frequency offset over a dispersive but spectrally flat channel in accordance with $$\Delta f = \frac{f_s}{2\pi k\alpha}\text{angle}[R_y(k)]$$

wherein $f_s$ is a sampling frequency, α is a constant, k is a constant associated with a capture range, and $R_y(k)$ is the determined autocorrelation of the received oversampled complex baseband digital signal.

15. A receiver comprising:
operational components including a demodulator and analog-to-digital converters for converting a modulated passband signal received over a dispersive but spectrally flat channel to an oversampled complex baseband digital signal;
a processor operably coupled to the operational components and configured to:
determine an autocorrelation of the oversampled complex baseband digital signal; and
estimate a carrier frequency offset over the dispersive but spectrally flat channel in accordance with $$\Delta f = \frac{f_s}{2\pi k\alpha}\text{angle}[R_y(k)]$$

wherein $f_s$ is a sampling frequency, α is a constant, k is a constant associated with a capture range, and $R_y(k)$ is the determined autocorrelation of the received oversampled complex baseband digital signal.

16. The receiver of claim 15, wherein α is determined based on a cutoff frequency of transmit and receive filters in a complex baseband representative of a communication system that includes the channel and a magnitude response of the channel.

17. The receiver of claim 15, wherein the processor is further configured to determine the autocorrelation in accordance with $$R_y(k)=\Sigma_n y(n)y^*(n-k)$$

wherein y(n) is an nth sample of the received complex oversampled baseband signal sampled at frequency greater than $f_b$, and k is an integer less than $f_s/f_b$, where $f_b$ is the baud rate of the received oversampled complex baseband digital signal.

18. The receiver of claim 17, wherein the processor is further configured to generate a corrected carrier frequency offset by adjusting a local oscillator to compensate for the estimated carrier frequency offset.

19. The receiver of claim 17, wherein the processor is further configured to generate a corrected carrier frequency offset by applying a direct digital frequency correction to the received oversampled complex baseband digital signal based on the estimated carrier frequency offset.

20. The receiver of claim 17, wherein processor is further configured to generate a corrected carrier frequency offset based on the estimated carrier frequency offset.

21. The receiver of claim 15, wherein α is a constant having a value between 0.5 and 0.8.

22. The receiver of claim 15, wherein α is a constant having a value of one.

23. The receiver of claim 15, wherein the processor is further configured to determine k in accordance with $$k=\lfloor f_s/(2f_{cap})\rfloor$$

wherein $f_s$ is a sampling frequency and $f_{cap}$ is a capture range.

24. The receiver of claim 21, wherein the processor is further configured to generate a corrected carrier frequency offset based on the estimated carrier frequency offset in response to a determination that the estimated carrier frequency offset is greater than a predetermined accuracy threshold.

25. The receiver of claim 23, wherein the processor is further configured to repeat the determination and estimation until the estimated carrier frequency offset is less than the predetermined accuracy threshold.

26. The receiver of claim 24, wherein the processor is further configured to generate a corrected carrier frequency offset by adjusting a local oscillator to compensate for the estimated carrier frequency offset.

27. The receiver of claim 24, wherein the processor is further configured to generate a corrected carrier frequency offset by applying a direct digital frequency correction to the received oversampled complex baseband digital signal based on the estimated carrier frequency offset.

* * * * *

UNITED STATES PATENT AND TRADEMARK OFFICE
CERTIFICATE OF CORRECTION

PATENT NO. : 8,989,316 B1  
APPLICATION NO. : 13/746219  
DATED : March 24, 2015  
INVENTOR(S) : Xiaofeng Wang Page 1 of 1

It is certified that error appears in the above-identified patent and that said Letters Patent is hereby corrected as shown below:

In the Claims

Column 10, claim 24, line 51, delete "claim 21" and insert therefor -- claim 22 --;

Column 10, claim 25, line 57, delete "claim 23" and insert therefor -- claim 24 --;

Column 10, claim 26, line 61, delete "claim 24" and insert therefor -- claim 25 --;

Column 10, claim 27, line 65, delete "claim 24" and insert therefor -- claim 25 --.

Signed and Sealed this  
Eleventh Day of August, 2015

Michelle K. Lee  
*Director of the United States Patent and Trademark Office*